W. H. WILLIAMS.

INSULATOR.

APPLICATION FILED SEPT. 19, 1916.

Reissued Feb. 6, 1917. 14,256.

Witnesses

J. R. Lamb

R. L. Parker

W. H. Williams,

Inventor by C. A. Snow & Co.

Attorneys

UNITED STATES PATENT OFFICE.

WILLIAM H. WILLIAMS, OF CAREY, OHIO.

INSULATOR.

14,256. Specification of Reissued Letters Patent. Reissued Feb. 6, 1917.

Original No. 1,176,801, dated March 28, 1916, Serial No. 693,487, filed April 26, 1912. Application for reissue filed September 19, 1916. Serial No. 121,093.

*To all whom it may concern:*

Be it known that I, WILLIAM H. WILLIAMS, a citizen of the United States, residing at Carey, in the county of Wyandot, State of Ohio, have invented a new and useful Insulator, of which the following is a specification.

This invention relates to insulators, and contemplates the production of an improved insulator designed to hold one or more wires, and to hold wires which cross each other at an angle.

This invention also aims to provide an insulator wherein wires that cross each other may be held in planes that are spaced apart in order to prevent the wires which cross each other from coming into accidental contact.

Another object of the present invention is to provide a two-part insulator of this character wherein the parts are duplicates or interchangeable, and of simple and inexpensive construction, as well as being convenient and efficient in use.

A further object of the present invention is to provide a device of this character wherein the two parts may be clamped together in an efficient manner by means of a single screw or securing member, and by the same means the insulator may be secured to a suitable support.

With the foregoing and other objects in view, which will be apparent as the invention is better understood, this invention resides in the novel construction and combination of parts hereinafter set forth and particularly pointed out in the appended claims, reference being had to the accompanying drawings, wherein the invention is illustrated in its preferred embodiment, it being understood that this invention is susceptible of slight alterations or deviations in its details within the scope of the appended claims without departing from the spirit of the invention.

In the accompanying drawings, wherein similar reference characters denote corresponding parts,—

Figure 1:
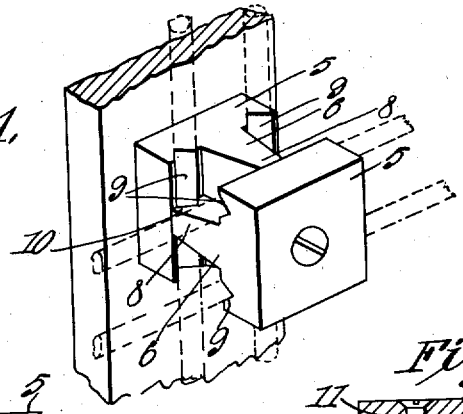
Figure 1 is a perspective view of the present insulator as in use.
Figure 2:
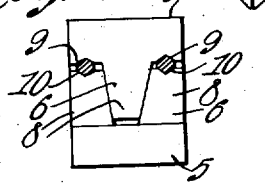
Fig. 2 is an elevation thereof.
Figure 3:
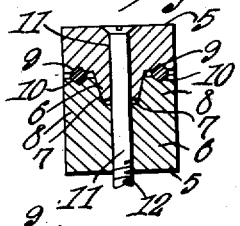
Fig. 3 is a central section through the insulator.
Figure 4:
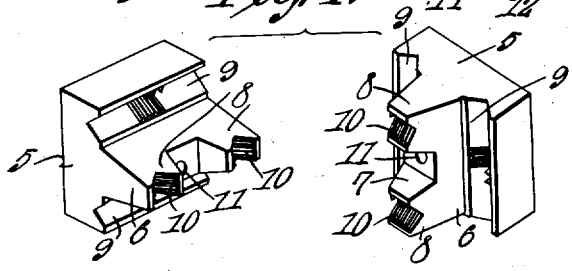
Fig. 4 is a perspective view of the two parts of the insulator separated.

Referring specifically to the drawings, each part or section of the insulator comprises a block 5 having a pair of parallel grooves 9 therein and extending throughout, a tapered rib 6 projecting from between the grooves and extending throughout the length of the block, a pair of lugs 8 projecting from the ridge of the rib at the ends thereof with their adjacent faces 7 diverging away from the block and the lugs having grooves 10 therein at right angles to the grooves 9, the block also having a central opening 11 therein extending through the rib 6 between the lugs 8. The parts may be constructed of porcelain, or any other suitable insulating material, and the block 5 is square in contour. The grooves 9 and 10 are preferably V-shaped and also corrugated transversely.

In assembling the two parts or sections, the ribs 6 of the parts are turned at right angles to each other, the ribs being disposed inwardly, and the parts are then moved together so as to cause the lugs 8 of each part to straddle or stand astride the rib 6 of the other part. The lugs of each part of the insulator are not only adapted to straddle the rib of the other part, but are also adapted to bind upon the rib of the other part so that the lugs and blocks of the opposite parts are spaced from each other when the parts are clamped together. This is of advantage for the reason that breakage or injury to the parts is eliminated, and the wires are not excessively gripped between the two members. The ribs being tapered and the adjacent faces of the lugs diverging from the blocks, also provides for readily molding or pressing the elements from plastic material. In this manner, the grooves 9 of each part will be made to register with the grooves 10 of the lugs 8 of the other part, so that the two pairs of registering grooves will be arranged at right angles to each other and in different planes. It will therefore follow, that the insulator may clamp two pairs of wires which cross each other so that the wires lie in different planes in order to prevent the accidental contact of the wires with each other and to also firmly grip the wires against sliding motion through the insulator. This insulator may also be employed for holding single wires which cross each other, or may be employed for clamping one, two or three wires, as will be apparent. The parts of the insulator are clamped together by means of a screw or bolt 12 which is passed through the openings 11 of the parts, the said openings being adapted to register when the parts are brought together and the screw or bolt may then be engaged to a suitable support in order to secure the insulator to the support and at the same time clamp the parts of the insulator together in order to hold the wires tightly therein. The outer ends of the openings 11 are countersunk to receive the head of the securing member, so that the securing member may be passed through the insulator in either direction.

The two parts of the insulator are identical in construction so that the parts are interchangeable, the parts being simple and inexpensive in construction. The two parts being interchangeable permit the parts to be readily assembled, and prevent confusion, as well as reducing the cost of manufacture of the parts. Although this insulator is shown and described as designed for holding from one to four wires, it is understood that the parts may be so constructed as to hold more than four wires, by enlarging each of the parts so as to provide more than two grooves 9 in each part, and so as to elongate the rib 6 in order to provide more than two grooves 10 for each part. It is further understood, that this device may be altered in its details in other respects than those mentioned, within the scope of the appended claims without departing from the spirit of the invention.

Summing up the description into a concise and concrete statement, the present insulator consists of two duplicate parts, each part of which comprises a rectangular block having a pair of parallel grooves in its inner face and a rib projecting from the inner face between and coextensive with the grooves, the sides of the rib being flat and lying in planes disposed wholly between and spaced from the respective grooves, and the rib having a central notch and a pair of transverse grooves at the sides of and spaced from the notch, the notches of the two parts permitting the ribs to interlock at their central points only, so as to provide spaces between the respective corners of the blocks, and the grooves of the respective blocks and the ribs being adapted to coöperate and clamp the wires and conductors in various manners. The corners of the blocks being spaced apart when the parts are assembled, permit the wires to be bent from the groove of one rib to the corresponding groove of the other rib, so that a wire may be connected to the insulator from one direction and then directed angularly, it being possible to accommodate two wires or conductors in this fashion. The sides of the ribs are also inclined or converged from the blocks to the ridges of the ribs, and the grooves are V-shaped in order that various sizes of wires or conductors may be accommodated, it being noted in this connection, that the respective grooves are spaced from the ribs and notches.

Having described the invention, what is claimed as new is:—

1. A two part insulator, each part comprising a square block having a rib on one face extending between two opposite sides midway between and parallel with the other sides, the ends of the rib being flat and flush with the first mentioned sides, the sides of the rib being flat and inclined toward each other, the rib having a transverse notch midway between its ends forming a pair of lugs, the sides of the notch being inclined away from each other, said lugs being tapered and having transverse V-shaped corrugated grooves in their ends, said grooves being spaced from the ends of the rib and sides of the notch, the said face of the block having V-shaped grooves midway between, spaced from and parallel with the sides of the rib and the second mentioned sides of the block, and extending to the first mentioned sides of the block, the said rib being disposed wholly between the second mentioned grooves, the first mentioned and second mentioned grooves being relatively short and long respectively, the second mentioned grooves being corrugated midway between their ends, and the block having a central bolt opening extending to the bottom of the notch; whereby the lugs of each part may straddle the central portion of the rib of the other part, with the first mentioned grooves of each part coöperating with the central portions of the second mentioned grooves of the other part, with the bolt openings of the two parts in register, and with the corners of the blocks and ends of the ribs spaced apart to form corner pockets.

2. A two-part insulator, each part comprising a block having a rib on one face extending between two opposite sides midway between and parallel with the other sides, the rib having a transverse notch midway between its ends forming a pair of lugs, said lugs having transverse grooves in their ends, the said face of the block having grooves between and parallel with the sides of the ribs and the second mentioned sides of the block, and extending to the first mentioned sides of the block, the said rib being disposed wholly between the second mentioned grooves, and the block having a central bolt opening extending to the bottom of the notch; whereby the lugs of each part may straddle the central portion of the rib of the other part, with the first mentioned grooves of each part coöperating with the central portions of the second mentioned grooves of the other part, with the bolt openings of the two parts in register, and with those portions of the blocks between said sides and ends of the ribs spaced apart to form corner pockets.

In testimony that I claim the foregoing as my own, I have hereto affixed my signature in the presence of two witnesses.

WILLIAM H. WILLIAMS.

Witnesses:

J. A. Gibbs,

H. H. Heck.